(12) United States Patent
Li et al.

(10) Patent No.: US 11,151,210 B2
(45) Date of Patent: Oct. 19, 2021

(54) TARGET LOCATION SEARCH METHOD AND APPARATUS

(71) Applicant: ADVANCED NEW TECHNOLOGIES CO., LTD., Grand Cayman (KY)

(72) Inventors: Tao Li, Hangzhou (CN); Fuliang Quan, Hangzhou (CN); Xing Rao, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 297 days.

(21) Appl. No.: 16/152,120

(22) Filed: Oct. 4, 2018

(65) Prior Publication Data

US 2019/0034440 A1    Jan. 31, 2019

Related U.S. Application Data

(63) Continuation of application No. PCT/CN2017/077998, filed on Mar. 24, 2017.

(30) Foreign Application Priority Data

Apr. 7, 2016 (CN) .......................... 201610213235.8

(51) Int. Cl.
  *G06F 16/90* (2019.01)
  *G06F 16/9537* (2019.01)
  *G06F 16/909* (2019.01)
  *G06F 16/29* (2019.01)

(52) U.S. Cl.
  CPC .......... *G06F 16/9537* (2019.01); *G06F 16/29* (2019.01); *G06F 16/909* (2019.01)

(58) Field of Classification Search
  CPC ..... G06F 16/29; G06F 16/909; G06F 16/9537
  See application file for complete search history.

(56) References Cited

U.S. PATENT DOCUMENTS

| | | | |
|---|---|---|---|
| 6,295,502 | B1 | 9/2001 | Hancock et al. |
| 6,397,143 | B1 | 5/2002 | Peschke |
| 6,609,062 | B2 | 8/2003 | Hancock |
| 7,882,102 | B2 | 2/2011 | Vechersky |
| 8,681,022 | B2 | 3/2014 | Beyeler et al. |

(Continued)

FOREIGN PATENT DOCUMENTS

| | | |
|---|---|---|
| CN | 101350013 A | 1/2009 |
| CN | 102176206 A | 9/2011 |

(Continued)

OTHER PUBLICATIONS

Non-final rejection and Search Report for Taiwanese Application No. 106107798 dated Dec. 6, 2019 (5 pages).

(Continued)

*Primary Examiner* — Eliyah S. Harper

(57) ABSTRACT

A search method comprises: determining a location designated by a target search request; determining a grid corresponding to the location in a gridded location area; and determining the grid's corresponding optimal search radius from correspondence relationships between grids and optimal search radiuses, and using the optimal search radius to perform a search corresponding to the target search request.

18 Claims, 4 Drawing Sheets

(56) References Cited

U.S. PATENT DOCUMENTS

| | | | |
|---|---|---|---|
| 8,682,576 B2* | 3/2014 | Kurtti | G01C 21/3679 |
| | | | 701/426 |
| 8,810,437 B2 | 8/2014 | Beyeler et al. | |
| 8,965,398 B2 | 2/2015 | Zhu et al. | |
| 9,111,397 B2* | 8/2015 | Kalai | G01C 21/26 |
| 2005/0108394 A1 | 5/2005 | Braun et al. | |
| 2005/0177303 A1 | 8/2005 | Han | |
| 2006/0218114 A1 | 9/2006 | Weare et al. | |
| 2009/0024315 A1 | 1/2009 | Scheibe | |
| 2009/0070293 A1 | 3/2009 | Vechersky | |
| 2010/0161221 A1* | 6/2010 | Jung | G01C 21/3614 |
| | | | 701/533 |
| 2011/0098917 A1* | 4/2011 | LeBeau | G06F 16/638 |
| | | | 701/533 |
| 2012/0197696 A1 | 8/2012 | Beyeler et al. | |
| 2013/0054647 A1 | 2/2013 | Terauchi | |
| 2013/0253831 A1 | 9/2013 | Langendorff | |
| 2014/0207795 A1 | 7/2014 | Zhou | |
| 2014/0223481 A1 | 8/2014 | Fundament | |
| 2014/0258281 A1 | 9/2014 | Chen et al. | |
| 2014/0333623 A1 | 11/2014 | Ozdas et al. | |
| 2015/0161122 A1 | 6/2015 | Merriman et al. | |
| 2015/0317356 A1* | 11/2015 | Deichler | G06Q 10/10 |
| | | | 707/760 |
| 2016/0048590 A1* | 2/2016 | Silverberg | G06F 16/9537 |
| | | | 707/722 |

FOREIGN PATENT DOCUMENTS

| | | |
|---|---|---|
| CN | 101821732 B | 9/2012 |
| CN | 104199860 A | 12/2014 |
| CN | 104252489 A | 12/2014 |
| JP | 2002-199434 A | 7/2002 |
| JP | WO 2009066393 A1 | 3/2011 |
| JP | 2012-14675 A | 1/2012 |
| JP | 2013-130909 A | 7/2013 |
| KR | 1020080101231 A | 11/2008 |
| KR | 1020140094001 A | 7/2014 |
| TW | 201013215 A | 4/2010 |
| TW | 201122437 A | 7/2011 |
| TW | I385408 B | 2/2013 |
| TW | I426239 B | 2/2014 |
| WO | 2009066393 A1 | 5/2009 |
| WO | 2010/040400 A1 | 4/2010 |
| WO | 2012072115 A1 | 6/2012 |
| WO | 2012106171 S1 | 8/2012 |

OTHER PUBLICATIONS

Office Action for Japanese Application No. 2018-553064 dated Oct. 29, 2019 (7 pages).
International Search Report and Written Opinion for Application No. PCT/CN2017/077998, dated Jun. 6, 2018, 8 pages.
Office Action for Korean Application No. 10-2018-7031992 dated Jan. 15, 2020 (10 pages).
First Search Report for Chinese Application No. 201610213235.8 dated Feb. 18, 2020 (2 pages).
First Office Action for Chinese Application No. 201610213235.8 dated Mar. 2, 2020 (11 pages).
Search Report for European Application No. 17778594.6 dated Aug. 21, 2019 (9 pages).
International Preliminary Report on Patentability Chapter I for PCT Application No. PCT/CN2017/077998 dated Oct. 9, 2018 (9 pages).
Final Office Action for Japanese Application No. 2018-553064 dated Mar. 3, 2020.
Office Action for Korean Application No. 10-2018-7031992 dated Apr. 14, 2020.
Second Office Action for Chinese Application No. 201610213235.8 dated May 8, 2020.
Notice of Allowance for Korean Application No. 10-2018-7031992 dated Oct. 13, 2020.

* cited by examiner

TARGET LOCATION SEARCH METHOD AND APPARATUS

CROSS REFERENCE TO RELATED APPLICATIONS

The present application is a continuation application of the International Patent Application No. PCT/CN2017/077998, filed on Mar. 24, 2017, and titled "TARGET LOCATION SEARCH METHOD AND APPARATUS." The PCT Application PCT/CN2017/077998 claims priority to the Chinese Patent Application No. 201610213235.8 filed on Apr. 7, 2016. The entire contents of all of the above applications are incorporated herein by reference in their entirety.

TECHNICAL FIELD

This application relates to the field of search engine technologies, and in particular, to a target location search method and apparatus.

BACKGROUND

The range of current location-based target searches (e.g., for businesses) typically use city as a dimension. However, this approach often leads to excessive or insufficient returned search results. If there are too many results returned by a search, for one aspect, the search results will have a large influence on system performance; for another aspect, excessive returned results may often include a considerable amount of contents not wanted by the user. Of course, if there are too few returned search results, contents needed by or of interest to the user may be left out, diminishing the user experience.

Therefore, how to precisely control the size of returned search result set in target location searches is a technical issue that urgently needs to be addressed.

SUMMARY

The objective of the embodiments of this disclosure is to provide a target location search method and apparatus, to precisely control the size of returned search result sets and improve the user experience.

To achieve this objective, according to one aspect, the embodiments of this disclosure provide a search method, comprising the following steps: determining a location designated by a target search request; determining a grid corresponding to the location in a pre-set gridded location area; and determining the grid's corresponding optimal search radius from pre-set correspondence relationships between grids and optimal search radiuses, and using the optimal search radius to perform a search corresponding to the target search request and obtain returned results.

According to another aspect, the embodiments of this disclosure also provide a search apparatus, comprising: a location determination module, configured to determine a location designated by a target search request; a grid determination module, configured to determine a grid corresponding to the location in a pre-set gridded location area; a search range determination module, configured to determine the grid's corresponding optimal search radius from pre-set correspondence relationships between grids and optimal search radiuses; and a returned results acquisition module, configured to perform a search corresponding to the target search request using the optimal search radius and obtain returned results.

According to another aspect, a search method comprises: determining a location designated by a target search request; determining a grid corresponding to the location in a gridded location area; and determining the grid's corresponding optimal search radius from correspondence relationships between grids and optimal search radiuses, and using the optimal search radius to perform a search corresponding to the target search request.

In some embodiments, the gridded location area comprises square grids of equal length and width.

In some embodiments, the correspondence relationships between the grids and optimal search radiuses are obtained by: respectively making the center point of each of the grids in the gridded location area a center of a circle, and performing a target search using an incrementally increasing radius, to obtain a minimum search radius for the each grid when reaching a pre-set returned number threshold; and using the minimum search radius as the grid's optimal search radius.

In some embodiments, after obtaining the returned results, the method further comprises: obtaining returned results for the search; determining whether a number of returned results is less than a pre-set lower limit of returned number; if the number of returned results is less than the lower limit of returned number, using a gradually expanding search radius to perform the search, until the number of returned results reaches the lower limit of returned number.

In some embodiments, the gridded location area is obtained by: within a set area, determining latitude and longitude information associated with all target search requests within a set historical time range; and mapping the latitude and longitude information to obtain the gridded location area.

In some embodiments, mapping the latitude and longitude information to obtain the gridded location area comprises: based on a Geohash algorithm, mapping the latitude and longitude information to obtain the gridded location area.

In some embodiments, mapping the latitude and longitude information to obtain the gridded location area based on a Geohash algorithm comprises: mapping latitude and longitude information corresponding to popular locations to obtain the gridded location area, the popular locations comprising locations for which a search volume is no less than a pre-set value.

In some embodiments, the gridded location area excludes grids comprising none of the popular locations.

According to another aspect, a search apparatus comprises a processor and a non-transitory computer-readable storage medium storing instructions that, when executed by the processor, cause the device to perform a search method. The method comprises: determining a location designated by a target search request; determining a grid corresponding to the location in a gridded location area; and determining the grid's corresponding optimal search radius from correspondence relationships between grids and optimal search radiuses, and using the optimal search radius to perform a search corresponding to the target search request.

According to another aspect, a non-transitory computer-readable storage medium stores instructions that, when executed by a processor, cause the processor to perform a search method. The method comprises: determining a location designated by a target search request; determining a grid corresponding to the location in a gridded location area; and determining the grid's corresponding optimal search radius from correspondence relationships between grids and optimal search radiuses, and using the optimal search radius to perform a search corresponding to the target search request.

In the embodiments of this disclosure, because popular locations are mapped in advance as a gridded location area based on historical search data, and the optimal search radius is calculated for each rectangular grid in the gridded location area, for each rectangular grid, the optimal search radius represents the optimal search radius for all the locations within the rectangular grid. Thus, because the correspondence relationships between popular locations and their optimal search radiuses are determined in advance, when a search for a given popular location is received, it is possible to quickly determine the optimal search radius for the popular location based on this correspondence relationship, such that ideal search results can be obtained when using this optimal search radius to perform searches. Therefore, the embodiments in this disclosure effectively control the size of returned search result set, improve the user experience, and vastly improve search engine performances.

BRIEF DESCRIPTION OF THE DRAWINGS

The accompanying drawings described here are used to provide a further understanding of the embodiments of this disclosure. They constitute a part of the embodiments of this disclosure, and do not constitute a limitation to the embodiments of this disclosure. In the accompanying drawings.

DETAILED DESCRIPTION

In order to illustrate the objectives, technical schemes, and advantages of the embodiments of this disclosure, in conjunction with embodiments and accompany drawings, a more detailed description of the embodiments of this disclosure is given below. Here, the illustrative embodiments of the embodiments of this disclosure and their descriptions are used to explain the embodiments of this disclosure, and do not constitute a limitation to the embodiments of this disclosure.

In conjunction with the accompanying drawings, a more detailed description of some implementations of the embodiments of this disclosure is given below.

Figure 1:
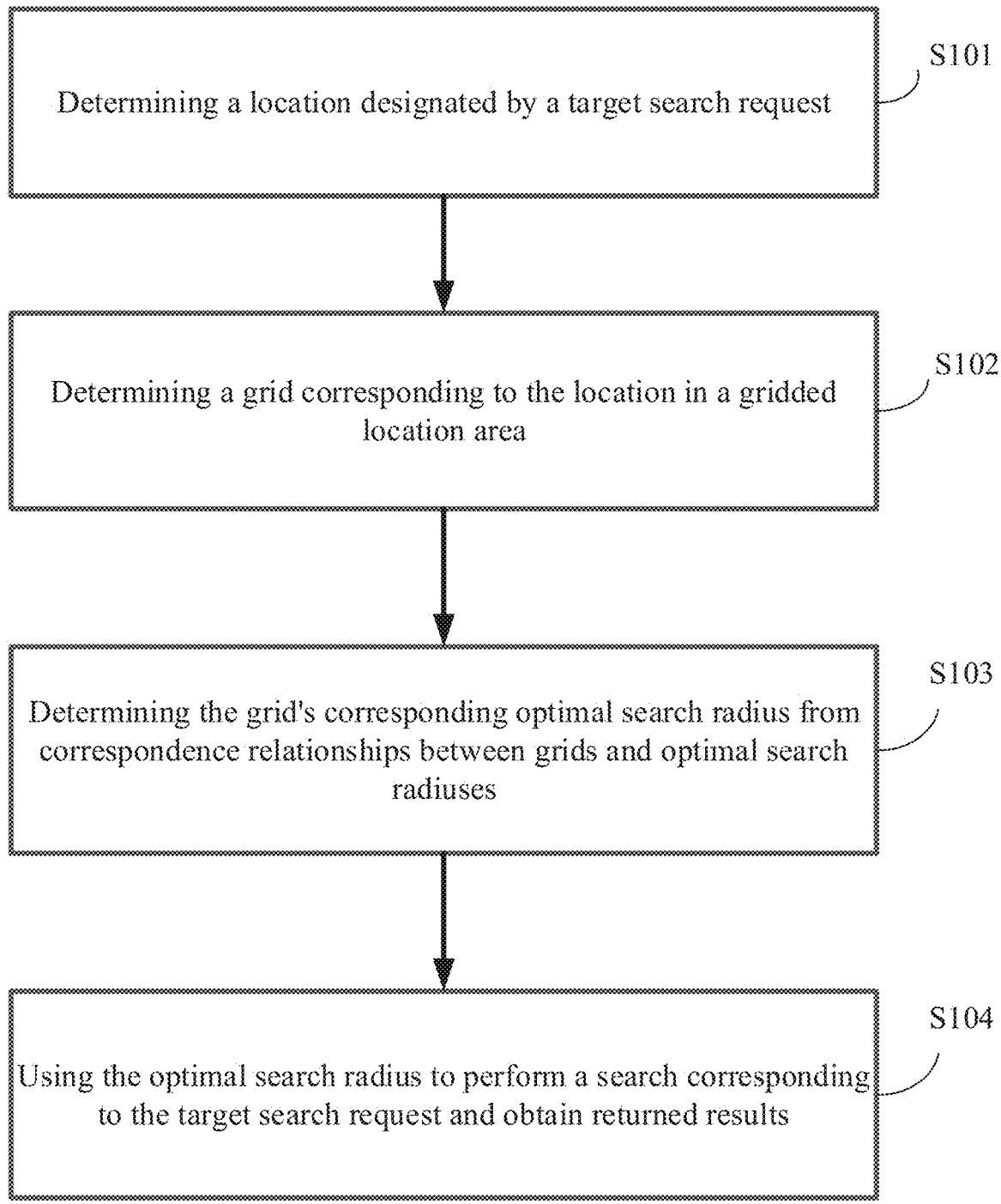
FIG. 1 is a flow diagram of the target location search method of the embodiments of this disclosure.

As shown in FIG. 1, the target location search method in the embodiments of this disclosure comprises the following steps:

Step S101, determining a location designated by a target search request.

In the embodiments of this disclosure, the target search request can be initiated by a user based on a personal computer or mobile terminal (e.g., a smart phone or tablet).

For example, the target search request can be a business search request. In some embodiments, the target search request may include a designated location.

In one embodiment of this disclosure, the designated location may comprise latitude and longitude data. In another embodiment of this disclosure, the designated location may comprise a location name or identifier (e.g., Beijing Subway Line 1 Xidan Station), then detailed latitude and longitude data can be acquired based on this location name or identifier.

Step S102, determining a grid corresponding to the location in a pre-set gridded location area.

In the embodiments of this disclosure, the gridded location area can be obtained in advance in the following way:

1) Within a set area, determining latitude and longitude information specified by all target search requests received by a system within a set historical time range. For example, using an ODPS (Open Data Processing Service) system to acquire, while offline, the PV (page view) logs for all business searches in Beijing within the past 7 days, and tallying, from the 7 days of PV logs (i.e., historical search data), the designated latitude and longitude information for all business searches in Beijing during that period of time.

2) based on a Geohash algorithm, mapping the latitude and longitude information to the gridded location area with square grids of equal length and width.

Figure 2:
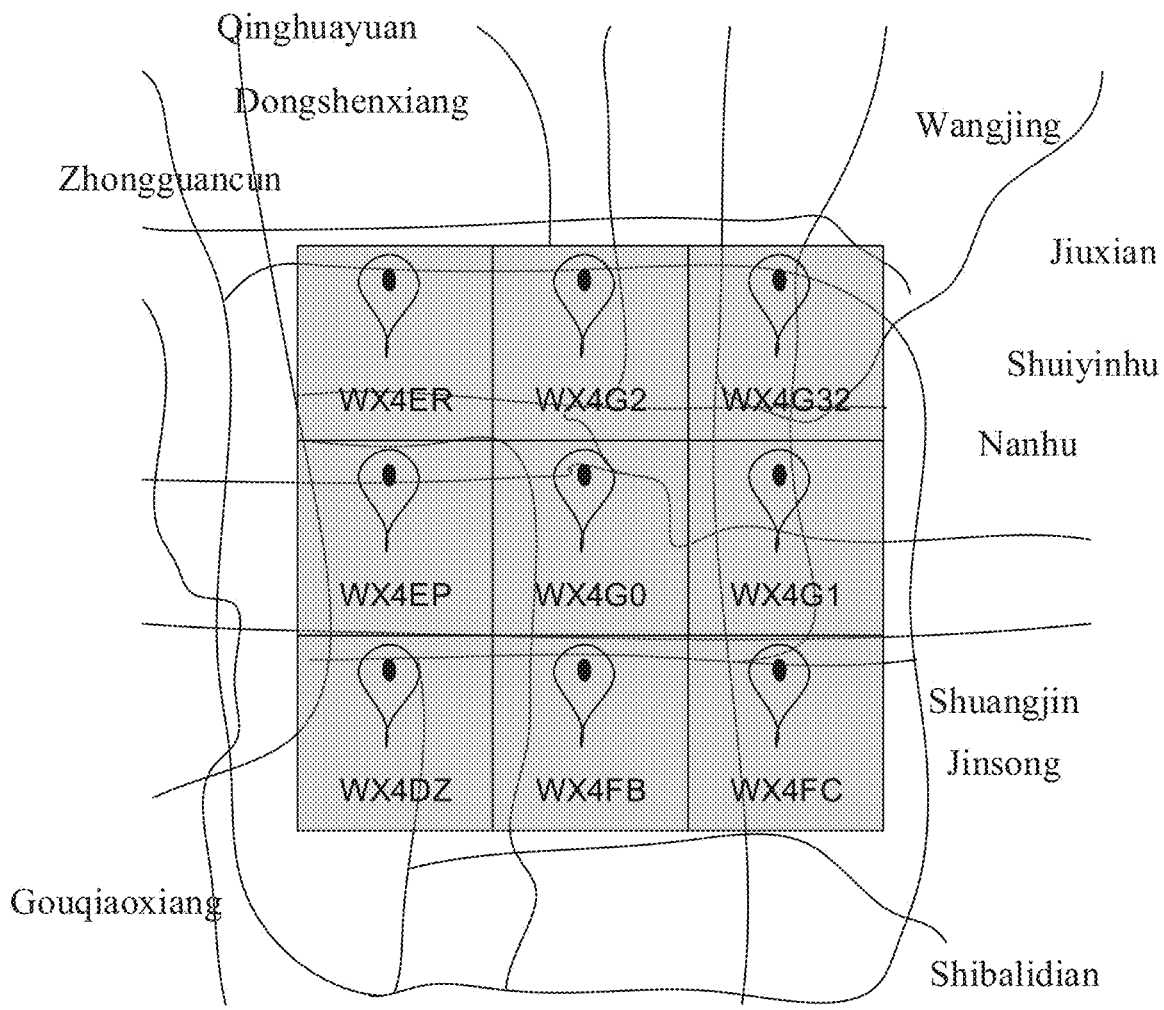
FIG. 2 is a diagram of the gridded location area in the target location search method of the embodiments of this disclosure.

In some embodiments of this disclosure, as shown in FIG. 2, the latitude and longitude information of popular locations in a set area and designated in the target search requests received by a system within a set historical time range can be mapped to the gridded location area with square grids of equal length and width. By this way, the target search demands for most locations are satisfied with little system overhead. Here, the popular locations may comprise places with a high search volume. During implementation, popular locations can be determined using a set threshold.

In some embodiments of this disclosure, a map of a set area can be uniformly gridded according to set rules. Here, the unpopular locations may comprise places that have not been searched or that have a very low search volume. During implementation, unpopular locations can be determined using a set threshold.

In some embodiments, the gridded location area may grid the popular locations and not the unpopular locations. That is, the gridded location area may exclude grids comprising none of the popular locations. As such, system resources such as storage space can be conserved by not gridding the unpopular locations.

Step S103, determining the grid's corresponding optimal search radius from pre-set correspondence relationships between grids and optimal search radiuses.

In the embodiments of this disclosure, the optimal search radius is obtained in advance in the following way:

Respectively making the center point of each of the grids in the gridded location area as a center of a circle, and performing a target search using an incrementally increasing radius, to obtain a minimum search radius for the each grid corresponding to the returned results when reaching a pre-set returned number threshold; and using the minimum search radius as the grid's optimal search radius.

Figure 3:
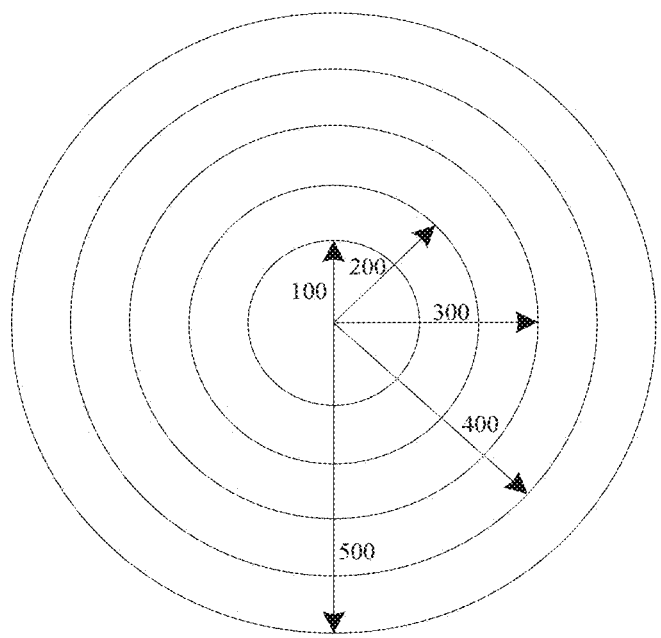
FIG. 3 is a diagram of the advance performance of a target search using an incrementally increasing radius, from the embodiments of this disclosure.

Using grid WX4G0 in FIG. 2 as an example, WX4G0 is the geohash code of a certain grid in a gridded location area. Using the center point of this grid as the origin, it is possible to perform a cyclic search using 100 meters, 200 meters, 300 meters, and the like incrementally increasing from small to large as the search radius (as shown in FIG. 3). Thus, it is possible to calculate the minimum search radius corresponding to the returned results when grid WX4G0 reaches a pre-set returned number threshold, and use the minimum search radius as the optimal search radius for this grid. In a similar fashion, it is possible to calculate the optimal search radius corresponding to the returned results when all of the geohash codes in FIG. 2 (i.e., all the grids in the gridded location area) reach the pre-set returned number threshold. Therefore, the embodiments of this disclosure can obtain in advance the correspondence relationships between all grids within a set area and in a gridded location area and their optimal search radiuses, i.e., obtain data for which geohash codes are keys and optimal search radiuses are values, as shown in Table 1:

TABLE 1

| key | value |
|---|---|
| WX4ER | 500 m |
| WX4G2 | 600 m |
| WX4G32 | 700 m |
| WX4EP | 800 m |
| WX4G0 | 900 m |
| WX4G1 | 1000 m |
| WX4DZ | 400 m |
| WX4FB | 1200 m |
| WX4FC | 800 m |

In some embodiments of this disclosure, it is possible to employ another mode (e.g., search radius going from large to small) to perform cyclic searches.

Step S104, using the optimal search radius to perform a search corresponding to the target search request (e.g., a search for the target) and obtain returned results.

In the embodiments of this disclosure, using an optimal search radius to perform a search means: using the designated location of the searched target as a center of a circle and using the searched target's optimal search radius as the search radius to perform a search.

In some embodiments, the target location search may refer to a search for locations of targets, such as restaurants, malls, garages, banks, or other establishments. For example, a user may use his mobile phone to search for shopping malls (in a target search request) from a web search engine, and the search engine server may obtain the mobile phone's current location as the location designated by the target search request. The search engine server may determine a grid corresponding to the obtained location in a gridded location area, and determine the grid's corresponding optimal search radius from correspondence relationships between grids and optimal search radiuses. The search engine server may use the optimal search radius to perform a search for the target (shopping mall) within the radius distance from the obtained location. Thus, the search engine server can return an appropriate amount of search results (e.g., ten shopping malls) close to the user. Thus, the user will not receive excessive or irrelevant search results.

Because the business sets within the optimal radius range of popular locations can change, after Step S104, another embodiment of this disclosure can comprise the following steps: determining whether a number of returned results is less than a pre-set lower limit of returned number; if the number of returned results is less than the lower limit of returned number, using a gradually expanding search radius for the searched target to perform the search, until the number of returned results reaches the lower limit of returned number, to improve the accuracy of returned results.

In addition, in another embodiment of this disclosure, the pre-set gridded location area and the correspondence relationship between the grids in the pre-set gridded location area and their optimal search radiuses can be regularly updated (e.g., updated once a day or once a week, etc.), to adapt to changes in target information near popular locations (e.g., changes in business such as shopping malls, supermarkets, and restaurants), thereby helping to improve the accuracy of returned results.

In the embodiments of this disclosure, because popular locations are mapped in advance as a gridded location area based on historical search data, and optimal search radiuses are calculated for each rectangular grid in the gridded location area, for each rectangular grid, the optimal search radius represents the optimal search radius for all the locations within that rectangular grid. Thus, because the correspondence relationships between popular locations and their optimal search radiuses are determined in advance, when a search for a given popular location is received, it is possible to quickly determine the optimal search radius for the popular location based on this correspondence relationship. This makes it possible to obtain ideal search results when using this optimal search radius to perform a search. Therefore, the embodiments in this disclosure effectively control the size of returned search result sets, improve the user experience, and vastly improve search engine performance.

Even though the process flows described by the preceding text comprise multiple operations appearing in a given sequence, these processes may comprise more or fewer operations, and these operations may be executed sequentially or in parallel (e.g., using a parallel processor or multithread environment).

Figure 4:
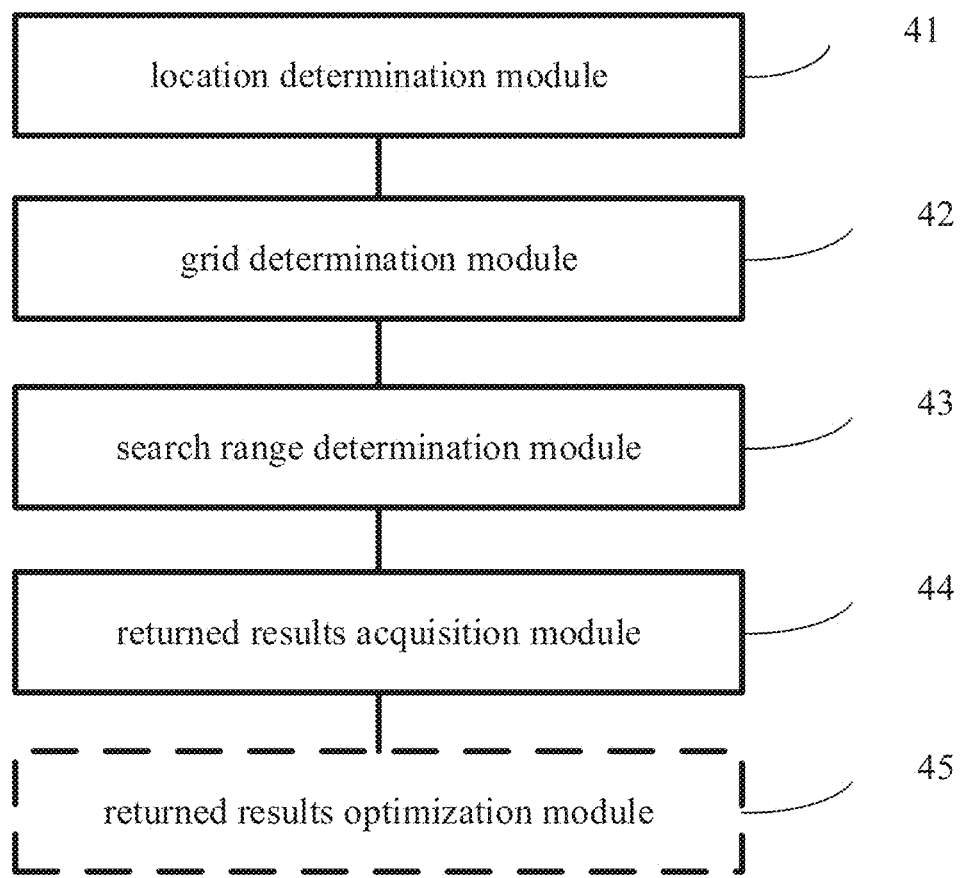
FIG. 4 is a structural block diagram of the target location search apparatus of the embodiments of this disclosure.

As shown in FIG. 4, the target location search apparatus of the embodiments of this disclosure comprises:

A location determination module 41, configured to determine a location designated by a target search request.

In the embodiments of this disclosure, the target search request can be initiated by a user based on a personal computer or mobile terminal (e.g., a smart phone or tablet).

For example, the target search request can be a business search request. The target search request may include a designated location.

In one embodiment, the designated location may comprise latitude and longitude data. In another embodiment, the designated location may comprise a location name or identifier (e.g., Beijing Subway Line 1 Xidan Station), then latitude and longitude data can be acquired based on this location name or identifier.

A grid determination module 42, configured to determine a grid corresponding to the location in a pre-set gridded location area.

In the embodiments of this disclosure, the gridded location area can be obtained in advance in the following way:

1) Within a set area, determining latitude and longitude information specified by all target search requests received by a system within a set historical time range. For example, using an ODPS system to acquire, while offline, the PV (page view) logs for all business searches in Beijing within the past 7 days, and tallying, from the 7 days of PV logs (i.e., historical search data), the designated latitude and longitude information for all business searches in Beijing during that period of time.

2) Based on a Geohash algorithm, mapping the latitude and longitude information to the gridded location area with square grids of equal length and width.

In one embodiment of this disclosure, as shown in FIG. 2, the latitude and longitude information of popular locations in a set area and designated in the target search requests received by a system within a set historical time range can be mapped to the gridded location area with square grids of equal length and width. By this way, the target search demands for most locations are met with little system overhead. Here, the popular locations may comprise places with a high search volume. During implementation, popular locations can be determined using a set threshold.

In another embodiment of this disclosure, a map of a set area can be uniformly gridded according to set rules. Here, the unpopular locations may comprise places that have not been searched or that have a very low search volume. During implementation, unpopular locations can be determined using a set threshold.

A search range determination module 43, configured to determine the grid's corresponding optimal search radius from pre-set correspondence relationships between grids and optimal search radiuses.

In the embodiments of this disclosure, the optimal search radius is obtained in advance in the following way:

Respectively making the center point of each of the grids in the gridded location area as a center of a circle, and performing a target search using an incrementally increasing radius, to obtain a minimum search radius for the each grid corresponding to the returned results when reaching a pre-set returned number threshold; and using the minimum search radius as the grid's optimal search radius.

Using grid WX4G0 in FIG. 2 as an example, WX4G0 is the geohash code of a certain grid in a gridded location area. Using the center point of this grid as the origin, it is possible to perform a cyclic search using 100 meters, 200 meters, 300 meters, and the like incrementally increasing from small to large as the search radius (as shown in FIG. 3). Thus, it is possible to calculate the minimum search radius corresponding to the returned results when grid WX4G0 reaches a pre-set returned number threshold, and use the minimum search radius as the optimal search radius for this grid. In a similar fashion, it is possible to calculate the optimal search radius corresponding to the returned results when all the geohash codes in FIG. 2 (i.e., all the grids in the gridded location area) reach the pre-set returned number threshold. Therefore, the embodiments of this disclosure can obtain in advance the correspondence relationships between all grids within a set area and in a gridded location area and their optimal search radiuses, i.e., obtain data for which geohash codes are keys and optimal search radiuses are values, as shown in Table 2:

TABLE 2

| key | value |
|---|---|
| WX4ER | 400 m |
| WX4G2 | 500 m |
| WX4G32 | 600 m |
| WX4EP | 700 m |
| WX4G0 | 800 m |
| WX4G1 | 1000 m |
| WX4DZ | 900 m |
| WX4FB | 1100 m |
| WX4FC | 800 m |

In another embodiment of this disclosure, it is possible to employ another mode (e.g., search radius going from large to small) to perform cyclic searches.

A returned results acquisition module 44, configured to perform a search for the target using the optimal search radius and obtain returned results.

In the embodiments of this disclosure, using an optimal search radius to perform a search means: using the designated location of the searched target as a center of a circle and using the searched target's optimal search radius as the search radius to perform a search.

In another embodiment of this disclosure, the target location search apparatus can also comprise: a returned results optimization module 45, configured to determine whether a number of returned results is less than a pre-set lower limit of returned number after the returned results acquisition module 44 obtains returned results; if the number of returned results is less than the lower limit of returned number, using a gradually expanding search radius for the searched target to perform the search, until the number of returned results reaches the lower limit of returned number.

Additionally, in another embodiment of this disclosure, the pre-set gridded location area and the correspondence relationship between the grids in the pre-set gridded location area and their optimal search radiuses can be regularly updated (e.g., updated once a day or once a week, etc.), to adapt to changes in target information near popular locations (e.g., changes in business such as shopping malls, supermarkets, and restaurants), thereby helping to ensure the accuracy of returned results.

In some embodiments, the various modules and units of the target location search apparatus may be implemented as software instructions (or a combination of software and hardware). That is, the target location search apparatus described with reference to FIG. 4 may comprise a processor and a non-transitory computer-readable storage medium storing instructions that, when executed by the processor, cause one or more components (e.g., the processor) of the target location search apparatus to perform various steps and methods of the modules and units described above. The target location search apparatus may also be referred to as a target location search system. In some embodiments, the target location search apparatus may include a mobile phone, a tablet computer, a PC, a laptop computer, a server, or another computing device.

In the embodiments of this disclosure, because popular locations are mapped in advance as a gridded location area based on historical search data, and optimal search radiuses are calculated for each rectangular grid in the gridded location area, for each rectangular grid, the optimal search radius represents the optimal search radius for all the locations within that rectangular grid. Thus, because the correspondence relationships between popular locations and their optimal search radiuses are determined in advance, when a search for a given popular location is received, it is possible to quickly determine the optimal search radius for the popular location based on this correspondence relationship. This makes it possible to obtain ideal search results when using this optimal search radius to perform a search. Therefore, the embodiments in this disclosure effectively control the size of returned search result sets, improve the user experience, and vastly improve search engine performance.

A person skilled in the art can also understand that the various illustrative logic blocks, elements, and steps listed in the embodiments of this disclosure may be achieved through hardware, software, or a combination of the two. A person skilled in the art can use various methods for specific applications to achieve these functions, but these implementations should not be understood as exceeding the scope of protection of the embodiments of this disclosure.

All of the various illustrative logical blocks or elements described in the embodiments of this disclosure can achieve or operate the described functions using a general processor, digital signal processor, application specific integrated circuit (ASIC), field programmable gate array, or other programmable logic apparatus, discrete gate or transistor logic, discrete hardware unit, or any combination of the above. A general processor can be a microprocessor, or it can be any traditional processor, controller, microcontroller, or state machine. Optionally, a processor can also be achieved through a combination of computation apparatuses, e.g., a digital signal processor and microprocessor, multiple microprocessors, one or more microprocessors joined with a digital signal processor core, or any other similar configuration.

The steps of the methods or algorithms described in the embodiments of this disclosure can be directly embedded into software modules executed by hardware or processors, or a combination of the two. The software modules can be stored in RAM memory, flash memory, ROM memory, EPROM memory, EEPROM memory, registers, hard drives, removable discs, CD-ROM, or a storage medium of any format in this field. As an example, the storage medium can be linked to a processor, making it possible for the processor to read information from the storage medium and write information into the storage medium. Optionally, the storage medium can be integrated into the processor. The processor and storage medium can be installed in an ASIC, and the ASIC can be installed in a user terminal. Optionally, the processor and storage medium can be installed in different units of a user terminal.

In one or more exemplary designs, the functions described by the embodiments of this disclosure can be achieved through hardware, software, firmware, or any combination of the three. If they are achieved through software, these functions can be stored in a computer-readable medium, or can be transferred in the form of one or more instructions or codes to a computer-readable medium. Computer-readable media comprise computer storage media and communication media enabling the transfer of computer programs from one place to another. Storage media can be any media accessible by a general computer or specialized computer. For example, this type of computer-readable media can comprise but is not limited to RAM, ROM, EEPROM, CD-ROM, or other optical disc storage, magnetic disc storage, or other magnetic storage apparatus, or any other medium that can be used to carry or store program code in the form of instructions or data structures, and other forms readable by general or specialized computers, or general or specialized processors. In addition, any connection can be appropriately defined as a computer-readable medium. For example, if a piece of software is transmitted from a website, server, or other remote resource through a coaxial cable, fiber-optic cable, twisted pair, or DSL or using infrared, wireless, or microwave wireless modes, this is also included as the defined computer-readable media. Discs and magnetic discs comprise zip discs, laser discs, optical discs, DVDs, floppy discs, and Blu-ray discs. Magnetic discs typically use the magnetic replication of data, whereas discs typically use lasers to perform the optical replication of data. The aforementioned combinations can also be included as computer-readable media.

The preceding embodiments provide a detailed description of the objectives, technical schemes, and beneficial effects of this disclosure. The preceding is merely specific embodiments of the embodiments of this disclosure, and is not used to limit the scope of protection of this disclosure. All modifications, equivalent substitutions, and improvements made within the spirit and principles of this disclosure shall fall within the scope of protection of this disclosure.

The invention claimed is:

1. A method, comprising:
   determining a location designated by a target search request;
   determining, from a gridded location area divided into multiple grids corresponding to respective geographical areas, a first grid of the multiple grids that corresponds to the location designated by the target search request;
   determining an optimal search radius of the first grid based on pre-set correspondence relationships between the multiple grids and optimal search radiuses, the pre-set correspondence relationships prepared in advance of receiving the target search request by:
      respectively making the center point of each grid of the multiple grids in the gridded location area a center of a circle, and performing a target search using an incrementally increasing radius to obtain a minimum search radius for each grid of the multiple grids when reaching a pre-set returned number threshold; and
      using the minimum search radius as the grid's optimal search radius;
   after determining the optimal search radius, performing a search corresponding to the target search request within a geographical area defined by a center point corresponding to the location designated by the target search request and the optimal search radius determined for the first grid; and
   obtaining search results of the search.

2. The method according to claim 1, wherein the multiple grids of the gridded location area comprise square grids of equal length and width.

3. The method according to claim 1, further comprising, after obtaining the search results of the search:
   determining whether a number of the search results is less than a pre-set lower limit; and
   when the number of the search results is less than the pre-set lower limit, using a gradually expanding search radius to perform the search, until the number of search results reaches the pre-set lower limit.

4. The method according to claim 1, further comprising:
   obtaining the gridded location area by:
      within a set area, determining latitude and longitude information associated with all target search requests within a set historical time range; and
      mapping the latitude and longitude information to obtain the gridded location area.

5. The method according to claim 4, wherein mapping the latitude and longitude information to obtain the gridded location area comprises:
   based on a Geohash algorithm, mapping the latitude and longitude information to obtain the gridded location area.

6. The method according to claim 5, wherein mapping the latitude and longitude information to obtain the gridded location area based on the Geohash algorithm comprises:
   mapping latitude and longitude information corresponding to popular locations to obtain the gridded location area, the popular locations comprising locations for which a search volume is no less than a pre-set value.

7. The method according to claim 6, wherein:
   the gridded location area excludes grids comprising none of the popular locations.

8. An apparatus, comprising a processor and a non-transitory computer-readable storage medium storing instructions that, when executed by the processor, cause the apparatus to perform operations comprising:
   determining a location designated by a target search request;
   determining, from a gridded location area divided into multiple grids corresponding to respective geographical areas, a first grid of the multiple grids that corresponds to the location designated by the target search request;
determining an optimal search radius of the first grid based on pre-set correspondence relationships between the multiple grids and optimal search radiuses, the pre-set correspondence relationships prepared in advance of receiving the target search request by:
respectively making the center point of each grid of the multiple grids in the gridded location area a center of a circle, and performing a target search using an incrementally increasing radius to obtain a minimum search radius for each grid of the multiple grids when reaching a pre-set returned number threshold; and
using the minimum search radius as the grid's optimal search radius;
after determining the optimal search radius, performing a search corresponding to the target search request within a geographical area defined by a center point corresponding to the location designated by the target search request and the optimal search radius determined for the first grid; and
obtaining search results of the search.

9. The apparatus according to claim 8, wherein the multiple grids of the gridded location area comprise square grids of equal length and width.

10. The apparatus according to claim 8, further comprising, after obtaining the search results:
determining whether a number of the search results is less than a pre-set lower limit; and
when the number of the search results is less than the pre-set lower limit, using a gradually expanding search radius to perform the search, until the number of search results reaches the pre-set lower limit.

11. The apparatus according to claim 8, wherein the operations further comprise: obtaining the gridded location area by:
within a set area, determining latitude and longitude information associated with all target search requests within a set historical time range; and
mapping the latitude and longitude information to obtain the gridded location area.

12. The apparatus according to claim 11, wherein mapping the latitude and longitude information to obtain the gridded location area comprises:
based on a Geohash algorithm, mapping the latitude and longitude information to obtain the gridded location area.

13. The apparatus according to claim 12, wherein mapping the latitude and longitude information to obtain the gridded location area based on the Geohash algorithm comprises:
mapping latitude and longitude information corresponding to popular locations to obtain the gridded location area, the popular locations comprising locations for which a search volume is no less than a pre-set value.

14. The apparatus according to claim 13, wherein:
the gridded location area excludes grids comprising none of the popular locations.

15. A non-transitory computer-readable storage medium storing instructions that, when executed by a processor, cause the processor to perform operations, comprising:
determining a location designated by a target search request;
determining, from a gridded location area divided into multiple grids corresponding to respective geographical areas, a first grid of the multiple grids that corresponds to the location designated by the target search request
determining an optimal search radius of the first grid based on pre-set correspondence relationships between the multiple grids and optimal search radiuses, the pre-set correspondence relationships prepared in advance of receiving the target search request by:
respectively making the center point of each grid of the multiple grids in the gridded location area a center of a circle, and performing a target search using an incrementally increasing radius to obtain a minimum search radius for each grid of the multiple grids when reaching a pre-set returned number threshold; and
using the minimum search radius as the grid's optimal search radius;
after determining the optimal search radius, performing a search corresponding to the target search request within a geographical area defined by a center point corresponding to the location designated by the target search request and the optimal search radius determined for the first grid; and
obtaining search results of the search.

16. The non-transitory computer-readable storage medium according to claim 15, further comprising:
within a set area, determining latitude and longitude information associated with all target search requests within a set historical time range; and
based on a Geohash algorithm, mapping the latitude and longitude information to obtain the gridded location area.

17. The non-transitory computer-readable storage medium according to claim 16, wherein mapping the latitude and longitude information to obtain the gridded location area based on the Geohash algorithm comprises:
mapping latitude and longitude information corresponding to popular locations to obtain the gridded location area, the popular locations comprising locations for which a search volume is no less than a pre-set value.

18. The non-transitory computer-readable storage medium according to claim 17, wherein:
the gridded location area excludes grids comprising none of the popular locations.

* * * * *